Patented Nov. 15, 1938

2,136,667

UNITED STATES PATENT OFFICE 2,136,667

BITUMINOUS EMULSIONS

Ernest Julius Bert, Melbourne, Victoria, Australia, assignor to Shell Development Company, San Francisco, Calif., a corporation of Delaware No Drawing. Application September 22, 1934, Serial No. 745,107

6 Claims. (Cl. 134—1)

This invention pertains to the manufacture of oil emulsions and is more particularly concerned with the preparation of aqueous emulsions of bitumen which are now extensively used in making and repairing roads.

All road oil emulsions may be divided into two large classes: the quick-setting or penetration type, where the rock aggregate is first graded and rolled on the road bed, and then sprayed or covered with a layer of road oil emulsion; and the mixing type, which may in turn be subdivided into the premix type, where emulsions are mixed with rock aggregate in special mixers before being spread on the road bed; and the mix-in-place type where the rock aggregate is placed on the road bed, sprayed with the emulsion, and then turned over and rolled flat by special harrows, graders and rollers. While emulsions prepared according to my method are especially recommended for the penetration type of work, they can also be used to great advantage when making roads by the mixing method.

In order to serve their purpose efficiently, these emulsions must possess certain properties, of which the most important is their stability. This term, as applied to bituminous road emulsions, embraces several meanings. Thus, mechanical stability refers to their ability of passing without breaking through various machinery used in processing, such as pumps, mixers, etc.; storage stability refers to their ability to keep the emulsified oil in suspension for a practically indefinite time in storage; weather stability refers to their ability to remain insensitive to changes of temperature, since hot weather usually tends to cause too quick a break of the emulsion, while freezing conditions lead to an agglomeration of dispersed particles, the emulsion becoming broken down in bulk and unfit for further use; finally, chemical stability refers to their ability to break quickly when applied to a mineral aggregate, so as to give a durable protective and binding coating. It has now become customary to rate the chemical stability of bituminous road emulsion by the so called demulsibility test. This test consists, for penetration emulsions in treating 100 gr. of emulsion with 35 c. c. 0.02 N calcium chloride solution for 2 minutes with stirring. For mixing emulsions, 50 c. c. of 0.1 N $CaCl_2$ solution are used. The weight of the material or asphalt which breaks during the process, multiplied by 100 and divided by the weight of the asphalt in the original emulsion gives the demulsibility percent. Although grave doubts have been expressed as to the practical value of this test, a 60+% demulsibility requirement is usually included in the specifications for penetration type road emulsions.

From the preceding discussion it is clear, that while the storage, the weather and the mechanical stability of road emulsions must be kept as high as possible, their chemical stability should be low to give the desired quick break on application to road aggregate.

In order to meet these various requirements, many stabilizing and antifreezing agents have been developed in the prior art, such as clay, alcohol, phenols, sugar and other carbohydrates, etc., which are added in different proportions to the emulsions.

These agents, however, while achieving to a certain degree their purpose, do not perceptibly affect the chemical stability or increase the demulsibility of road emulsions, and, moreover, give rise to difficulties of their own.

It is a purpose of this invention to effect a considerable decrease in the chemical stability of emulsions by the addition of small quantities of certain substances thereby improving their penetrating, breaking and temperature resisting properties, and making unnecessary the addition of any other stabilizing or anti-freezing agents.

It is also a purpose of this invention to use to this end substances which can easily and cheaply be obtained as by-products in other manufacturing processes, and are therefore eminently desirable from an economical standpoint.

Briefly, this process consists in emulsifying an asphaltic mineral oil in water, using as emulsifier a soap solution, preferably made of a rosin, such as liquid rosin, Swedish rosin, the commercial B-grade rosin, or a tall oil, as described in U. S. Patent No. 1,938,532, or of an alkali soap of fatty acids obtainable from vegetable or animal oils, and adding to this emulsifier a small quantity of unrefined sugar cane molasses, while carefully controlling the alkalinity of the emulsion. I found beet sugar molasses to be far less suitable for the purpose of this invention than sugar cane molasses, which is the preferred form of the material.

I am well aware that the use of sugar and of sugar waste products in road oil emulsions is known in the art. Owing, however, to the character and the amounts of molasses used as well as to the conditions under which the emulsions were prepared, only negative results have been obtained so far, and the use of molasses in road oil emulsions has never been practiced on a significant scale. For example, apparently no effort was made to control the alkalinity of the emulsions. Since molasses usually have an alkaline reaction, their addition to an emulsion already having the desired degree of alkalinity tended to make them over-alkaline and resulted in undesirable properties in the final product. According to this invention, a careful control of alkalinity is necessary during the process, as will be seen from the examples below.

In some cases, sugar waste products were added with a double view of stabilizing and of increasing the tackiness of the emulsions. Accordingly, they were used in very large amounts: thus, U. S. D. A. Public Roads circular No. 90, pp. 8–9, mentions the use of 34% molasses in an oil emulsion, while in other processes 5 to 10% molasses were used. The addition of such large quantities of molasses resulted in a very quick-breaking product of excessive stickiness which eliminated the use of machinery such as pumps, mixers and graders, and rendered even the manual handling of the material impracticable owing to the gumming of brooms and squeegees. Sugar waste products were usually either run through a preliminary refining process or were incorporated into the emulsion in a diluted state. Both of the factors led to a coarsening of the dispersion and caused a coalescence or coagulation of particles detrimental to the storage stability of the emulsion.

Finally, molasses was as a rule added not to the emulsifier, but to the already emulsified product which further precluded the possibility of effective action.

It will be apparent from the following description of my method that it is possible to avoid these undesirable features and to prepare highly satisfactory road oil emulsions containing sugar cane molasses.

Practically any good quality road oil or steam-refined asphalt may be used for my process, such, for example, as distillation petroleum residues, or oxidized, or cracked petroleum residues. For example, I can use for my emulsion a 160–170 penetration asphalt, commercially known as the 95+ Road Oil, or E Grade asphalt. A suitable emulsifier may be prepared as an aqueous alkali soap solution having a slight excess of alkali to indicate a complete saponification of the rosin or fatty acid used. The soap solution may be made from an alkali, preferably potassium, and fatty acids derived from vegetable oils or animal fats, or a wood rosin, such, for example, as the Swedish liquid rosin, which is especially desirable, since its potassium soap is particularly effective as an emulsifying agent and may be obtained as a by-product in the manufacture of paper wood-pulp, being therefore available at advantageous market prices, while possessing at the same time a dependably constant composition, guaranteeing a finished emulsion of constant character. The concentration of soap in the emulsifier, which is added to the oil usually in proportion of from 30 to 55% of the mixture, and preferably about 40% thereof, should be, for penetration emulsions from 0.5 to 2%, more or less, and for mixing emulsions from about 3 to 7%, more or less. The alkalinity of the emulsifier preferably should not exceed about 0.2% for the penetration type, and 0.7% for the mixing type of emulsions. Instead of a soap, other emulsifiers can be used such as clay, sodium phosphates, sodium borate, sodium silicate, etc. To this emulsifier I add a certain amount of sugar cane molasses, such, for example, as the cheapest grade of Hawaiian blackstrap, a typical analysis of which is given below:

| | Per cent |
|---|---|
| Sucrose | 31 |
| Invert sugar | 16 |
| Water | 25 |
| Ash | 9 |

The molasses is added to the emulsifier in such quantities as to assure a specified percentage in the final product, depending on the type of emulsion desired. In penetration emulsions this percentage usually should not be over about 0.3%, and in mixing emulsions not over about 0.5%; generally, the molasses content of an emulsion should not exceed 1%.

After the molasses has been added to the emulsifier, the latter is mixed with the oil by any conventional emulsification process, for example, by means of a colloid mill. The temperature of the emulsifier may be held at normal or raised to about 120° F.

The examples below give the composition and the specific conditions under which emulsions are made according to my process, and clearly point to the advantages of introducing therein molasses in disclosed quantities.

A. Penetration type emulsions

Example I.—No molasses added:

| | |
|---|---|
| Bitumen per cent | 62 |
| Water solution do | 38 |
| Soap (per cent of aqueous phase) per cent | 1 |
| Alkali (per cent of aqueous phase) per cent | 0.1 |
| Molasses do | 0 |
| Viscosity (Say. furol at 77° F.) sec | 32 |
| Demulsibility (35 c. c. of 0.02 N CaCl$_2$) per cent | 48 |

Example II.—Molasses added:

| | |
|---|---|
| Bitumen per cent | 64 |
| Water solution do | 36 |
| Soap (per cent of aqueous phase) per cent | 1.3 |
| Alkali (per cent of aqueous phase) per cent | 0.05 |
| Molasses (sugar cane) do | 0.12 |
| Viscosity (Say. furol at 77° F.) sec | 30 |
| Demulsibility (35 c. c. of 0.02 N CaCl$_2$) per cent | 85 |

The following remarks may be made on the use for road construction of the emulsions prepared in Examples I and II.

1. A heavier coating of aggregate was obtained with emulsion II.
2. The asphalt of emulsion II, once broken, exhibited a more tacky film, better cohesion and adhesion than that of emulsion I.
3. The need of free or excess alkali or of any further stabilizing agents, such as clay, etc., was eliminated in emulsion II.
4. Emulsion II was well within the limits of a minimum 60% demulsibility specification while emulsion I failed to satisfy that requirement.

*B. Mixing type emulsions*

Example III.—No molasses added:
- Bitumen _____ per cent__ 59
- Water solution _____ do____ 41
- Soap (per cent of aqueous phase) per cent__ 3.5
- Alkali (per cent of aqueous phase) per cent__ 0.55
- Molasses _____ do____ 0
- Viscosity (Say. furol at 77° F.) __sec__ 35
- Demulsibility (50 c. c. of 0.1 N CaCl₂) per cent__ 5

Example IV.—Molasses added:
- Bitumen _____ per cent__ 64.5
- Water solution _____ do____ 35.5
- Soap (per cent of aqueous phase) per cent__ 3.5
- Alkali (per cent of aqueous phase) per cent__ 0.55
- Molasses (sugarcane) _____ do____ 0.31
- Viscosity (Say. furol at 77° F.) __sec__ 41
- Demulsibility (50 c. c. of 0.1 N CaCl₂) per cent__ 80

The following remarks may be made on the use for road construction of emulsions prepared in Examples III and IV.

1. No appreciable breakdown of the emulsion IV occurred during the process of mixing with the aggregate, although the time element may have extended for several minutes.

2. Better mixing properties and less frothing were noticed with emulsion IV.

3. The increase in demulsibility due to the addition of the molasses was especially striking in the case of mixing type emulsions.

While great care is recommended while using such emulsions in hot weather, since a temperature of about 90° F. may result in too quick a break, the following example shows the superiority of an emulsion prepared according to my method over an ordinary road oil emulsion. Two experimental sections of road were constructed using emulsions of Examples III and IV. Shortly after the two sections were laid according to the regular mix-in-place practice, a heavy rain fell, and an examination made twelve hours later, while showing both sections intact, disclosed a considerable amount of unbroken and diluted emulsion in the section constructed with the material of Example III, whereas the section where molasses were used showed an almost complete break and no dilution.

I claim as my invention:

1. A stable oil-in-water emulsion comprising an asphaltic bitumen dispersed in the water phase, an emulsifying agent, and a non-thickening amount of molasses, said amount being less than about 1.0% by weight of the emulsion.

2. The emulsion of claim 1, wherein the emulsifying agent is a water soluble soap of the Swedish liquid rosin.

3. The emulsion of claim 1, wherein the emulsifying agent has an alkalinity of less than about .7%.

4. An oil-in-water emulsion made of asphaltic bitumen dispersed in alkaline water phase, containing less than 5% of a water-soluble alkali soap of wood rosin, and a non-thickening amount of molasses, said amount being less than about 1.0% by weight of the emulsion.

5. The emulsion of claim 1 having the following composition by weight: bitumen about 60% and water solution about 40%, the water solution containing about 1.5% water-soluble alkali soaps of wood rosin and about 0.2% molasses.

6. The emulsion of claim 1 having the following composition by weight: bitumen about 60% and water solution about 40%, the water solution containing about 3.5% water-soluble alkali soap of wood rosin and about 0.5% molasses.

ERNEST JULIUS BERT.